US009732729B2

(12) United States Patent
Sandor

(10) Patent No.: US 9,732,729 B2
(45) Date of Patent: Aug. 15, 2017

(54) CAPTURE DEVICE AND METHOD FOR WIND AND WATER POWER GENERATION

(71) Applicant: Peter Sandor, Allen, TX (US)

(72) Inventor: Peter Sandor, Allen, TX (US)

(*) Notice: Subject to any disclaimer, the term of this patent is extended or adjusted under 35 U.S.C. 154(b) by 204 days.

(21) Appl. No.: 14/593,817

(22) Filed: Jan. 9, 2015

(65) Prior Publication Data

US 2015/0198143 A1 Jul. 16, 2015

Related U.S. Application Data

(60) Provisional application No. 61/925,860, filed on Jan. 10, 2014.

(51) Int. Cl.
*F03D 3/06* (2006.01)
*F03B 17/06* (2006.01)

(52) U.S. Cl.
CPC ............ *F03D 3/065* (2013.01); *F03B 17/063* (2013.01); *F03D 3/061* (2013.01); *F05B 2210/16* (2013.01); *F05B 2240/33* (2013.01); *F05B 2250/232* (2013.01); *Y02E 10/28* (2013.01); *Y02E 10/74* (2013.01)

(58) Field of Classification Search
CPC . F03D 3/06; F03D 3/061; F03D 3/065; F03D 3/005; F03D 15/05
USPC ..................................... 416/231 R
See application file for complete search history.

(56) References Cited

U.S. PATENT DOCUMENTS

| 2,224,851 | A | * | 12/1940 | Lea | F03D 3/065 |
| | | | | | 116/173 |
| 4,402,650 | A | * | 9/1983 | Jones | F03D 3/061 |
| | | | | | 416/101 |
| 6,465,899 | B2 | | 10/2002 | Roberts | |
| 7,329,965 | B2 | | 2/2008 | Roberts | |
| 7,400,057 | B2 | | 7/2008 | Sureshan | |
| 8,226,369 | B2 | | 7/2012 | Clark | |
| 2008/0050237 | A1 | * | 2/2008 | Lee | F03D 3/005 |
| | | | | | 416/197 A |
| 2010/0166553 | A1 | | 7/2010 | Haddjeri | |
| 2012/0230835 | A1 | | 9/2012 | Gamon Polo | |
| 2013/0017083 | A1 | * | 1/2013 | Graham | F03D 7/0232 |
| | | | | | 416/1 |
| 2013/0236306 | A1 | * | 9/2013 | Cory | F03D 1/04 |
| | | | | | 416/1 |

FOREIGN PATENT DOCUMENTS

WO    WO 2011011018 A1    1/2011

* cited by examiner

*Primary Examiner* — Gregory Anderson
*Assistant Examiner* — Cameron Corday
(74) *Attorney, Agent, or Firm* — Lori J. Sandman, Esq

(57) ABSTRACT

The present invention relates to the field of energy generation. More specifically, it concerns a capture device and method which replaces and improves upon blades typically used for harnessing wind or water for power generation. The capture device is capable of efficient operation in a range of environmental conditions.

9 Claims, 3 Drawing Sheets

CAPTURE DEVICE AND METHOD FOR WIND AND WATER POWER GENERATION

CROSS-REFERENCE TO RELATED APPLICATIONS

This application claims priority to U.S. Provisional Patent Application No. 61/925,860.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

The present invention relates to the field of energy generation. More specifically, it concerns a capture device that replaces and improves upon blades typically used for harnessing wind or water for power generation. The capture device is capable of efficient operation in a range of environmental conditions. The invention disclosed provides a device and method capable of capturing wind and water for production of a constant, readily available and renewable source of energy.

Power generation is critically important globally, and demand for renewable, efficient energy sources continues to grow. Wind and water power has been harnessed for centuries to provide power; the capture of kinetic energy from these fundamental elements has fascinated inventors and inspired entrepreneurs, scientists and commercial ventures throughout the world. Wind farms, hydroelectric facilities, and the technology that supports them have been growing and improving rapidly, in part due to large research investments and public policy shifts favoring the use of alternative and renewable energy resources.

The quantity of economically extractable power available from wind or water depends on the equipment used for capture, conversion and storage. To capture the force of wind and water, blades are typically engaged by the moving wind or water and pushed to rotate a turbine, creating mechanical energy. The spinning blades are attached to a hub and shaft, which powers a generator that converts the mechanical energy from the rotation of the blades into electric energy.

Blades for capturing wind and water power have been described and used in many shapes, relative orientations and dimensions. Blade shape is one vital contributor to efficiency of any power generation system, and optimization of the shape optimizes element capture. Flat, twisted, helical, spheroid and many other blade shapes have been explored. Blade length, width, pitch, number, weight and distribution about the axis must be considered. New designs are needed for continued improvement in efficiency of currently operating and new wind and water power generation systems.

The invention disclosed herein is a new design for a highly efficient, aerodynamic, hydrodynamic, and cost effective alternative to blades for wind and water generation. The disclosed capture devices can be manufactured and retrofitted for use with many existing generators currently operating or commercially available. Instead of a blade system, the invention and method described utilizes a capture body as specified herein. Power generated from captured elements can be harvested and stored for future use.

All patents, patent applications, provisional patent applications and publications referred to or cited herein, are incorporated by reference in their entirety to the extent they are not inconsistent with the teachings of the specification.

BRIEF DESCRIPTION

The present invention is a device and method of use for capture of fluid elements for renewable wind and water power generation. The capture body is effective when used in conjunction with vertical axis wind turbines (VAWT's), and offers advantages over traditional flat or helical twist blades. It comprises a vertical axis disposed, horizontally mounted body which includes a pressure relief outlet. It functions well in high wind and water pressure environments, and is also efficient at low wind and water speeds. The device is noise free, environmentally friendly and safe for birds. One end of the capture device comprises an aperture for element intake, while the other end is aerodynamically or hydrodynamically disposed to optimize rotation potential. In one embodiment, the capture body is conically disposed, and curves around a hub, which is oriented perpendicular to a rotor. The body captures wind or water through the intake aperture as it passes through the air or water. This aperture has a relatively large diameter which tapers down to a smaller relative diameter at the tip, or apex; air or water flow into the aperture results in pressure increases inside relative to outside of the body. Flow into the body builds in velocity as it is compressed towards the apex, resulting in extremely efficient rotational force on the hub and rotor. The shape, specifically wide at the one end and tapering to a relatively narrow portion or apex, concentrates the flow and thereby increases speed of the element (air or water) within the capture body, resulting in enhanced push on the rotor. Although the preferred embodiment is conically disposed, the capture body can be made in a variety of shapes, including but not limited to square, rectangular, deltoid, triangular, ovoid or rounded configurations. The size and shape of the capture body determines the energy output; larger capture bodies can capture more of the element and therefore potentially generate more pressure directed to turning the rotor, but must be made of a stronger material capable of withstanding such pressure. This invention contemplates capture devices made of a spectrum of materials, including but not limited to metal, plastic, ceramic or other appropriate materials suited to and sized for the environmental conditions in which the invention operates.

The device described by this invention further comprises a pressure relief outlet, which releases the wind or water from inside the body, allowing avoidance of potential overspin. This relief outlet is positioned near the apex of the body, and comprises a relief body that is contoured, following the capture body shape, but smaller. As air and water exit the body, thrust is enhanced. The relief outlet also allows for drainage, and is sized according to conditional requirements. In the preferred embodiment the relief body includes a scooped lip that diminishes turbulence in and around the body, which stabilizes the device, substantially enhances function and reduces maintenance over time.

In one possible configuration, a plurality of capture devices are mounted onto a hub, with the relief outlet oriented at the bottom, or underside. Bodies and pressure relief outlets are sized and shaped to optimize conditions and capture. The size of each capture device, shape, and number of devices used is predominantly dependent upon the geographic, geologic and hydrologic circumstances. Site conditions that impact choice of size and shape include but are not limited to average wind or water speed and materials used to construct the capture device. Capture bodies may be straight or curved around the rotatable hub and attached to a central shaft. Utilization of a conical shape for the capture body results in captured air or water acceleration and pressure increases as the captured element passes through the cone towards the apex, and is ultimately released out through the relief aperture. The central shaft is turned by the force generated when air is captured within the device and forced into the narrowing capture body by the rotational movement of the hub through the air or water, which creates and amplifies air pressure resulting in force directed to the central shaft and ultimately to a power generator.

This invention avoids the challenges associated with wind and water direction; capture occurs from all directions at all times due to the plurality of capture devices used. When multiple devices are mounted on a rotatable hub, capture occurs in a three hundred and sixty degree radius. Because capture of wind and water elements is omni-directional, capture bodies are able to catch wind and water without tracking. This enhances reliability in a variety of environmental conditions. This can be especially effective and a distinct advantage when mounted upon a vertical axis wind turbine.

Another advantage of the invention is that it does not require high towers or specialized mounting. Capture devices and their corresponding power generation systems can be mounted on houses, high rise buildings, on beaches and offshore locations including ships, buoys and ocean rigs, at airports, upon vehicles utilizing rechargeable electric batteries, and essentially anywhere there is moving air or water. Where necessary, the device can be placed under a roof, overhang or cover to protect it from ice formation or other matter that may impact it from above.

A further advantage of the invention is that it will not generally break or clog with debris. With typical blades used in the prior art, debris striking the blade from the surrounding wind or water can damage or break a blade. In the present invention, the shape protects the capture device from debris strikes, as it is attached to and supported by the hub. The capture body, by virtue of its shape, is more resistant to debris strikes than a flat blade. Also, any debris that enters the intake aperture and does not get forced out of the relief aperture will be removed by the element flow when the rotor reaches the opposite direction and pressure within the capture device is removed or reversed.

A different advantage of the present invention is that a plurality of hub-mounted capture devices can be stacked upon one or more rotors to allow multiple capture devices to work in concert, thereby increasing element capture and consequent pressure on the rotor, enhancing rotor spin. In this way, energy harvest can potentially be significantly increased.

A separate advantage over present wind and water generation systems is that the present invention does not require tremendous height or depth for efficient element capture. The generator, electric box, transformers, etc. can be at or near ground or water level, where they can be easily accessed for maintenance or replacement. Rows of capture devices can be mounted upon a hub and placed at spacing appropriate to the on-site environmental conditions, thereby potentially reducing the elevation of towers required with typical flat blades.

Still another advantage to this invention is that the intake and relief apertures can include a variable open and close function, which could be manual or automated. This way, the device can be adjusted to restrict or increase air flow, providing added flexibility for use in a range of environmental conditions.

DESCRIPTION OF REFERENCE NUMBERS AND LETTERS

10 Capture body
20 Apex
30 Intake aperture
40 Relief outlet
50 Hub
60 Relief aperture
65 External relief body
70 Rotational direction
80 Element flow direction at intake
90 Element flow direction at relief outlet

DETAILED DESCRIPTION

Figure 1:
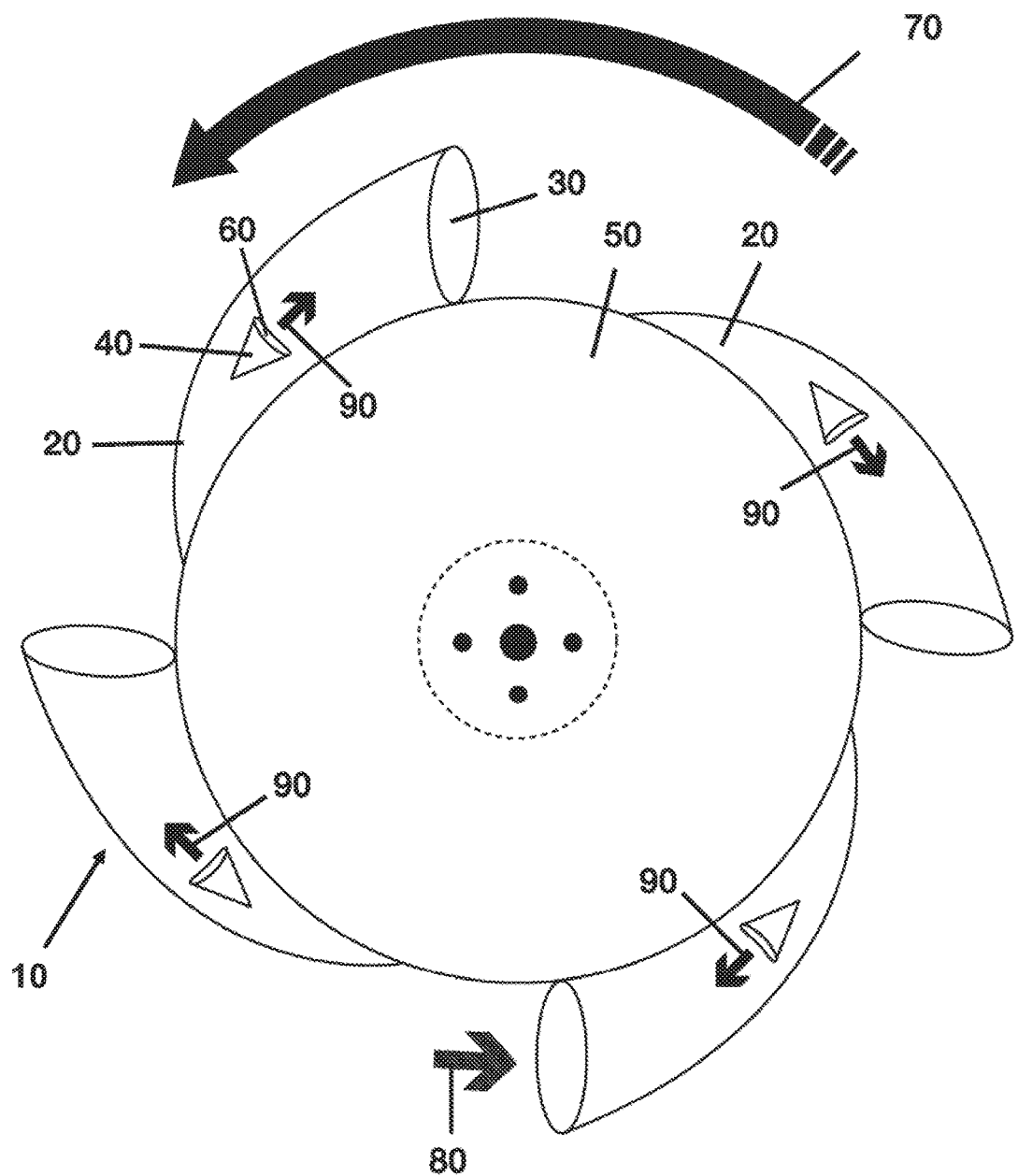
FIG. 1 is a perspective view from the underside of a hub showing the preferred embodiment of the invention mounted upon the hub.

FIG. 1 depicts a plurality of the capture device invention mounted upon the outside edge of a typical vertical axis hub 50 used in wind and water power generation. As the fluid element (air or water) moves in the area of the capture body 10, it flows into and around it, with a portion entering the capture body 10 through the intake aperture 30. The direction of the elemental movement is shown by the arrow at 80. Pressure created from the moving element passing through the intake aperture 30, then down through the capture body 10 pushes the hub 50 about its axis upon a central shaft, connected to a rotor, which drives a turbine capable of generating mechanical or electrical energy. The direction of rotation of the hub around its axis is depicted by the arrow at 70. The capture body 10 narrows dimensionally from the intake aperture 30 to the apex 20. As the element moves through the capture body 10, the decrease in width or diameter results in concentration of the force and consequent pressure of the element within the capture body 10, resulting in rotation of the hub 50 about the axis, turning the rotor. The moving element is forced out through the relief outlet 40 at the relief aperture 60.

Figure 2:
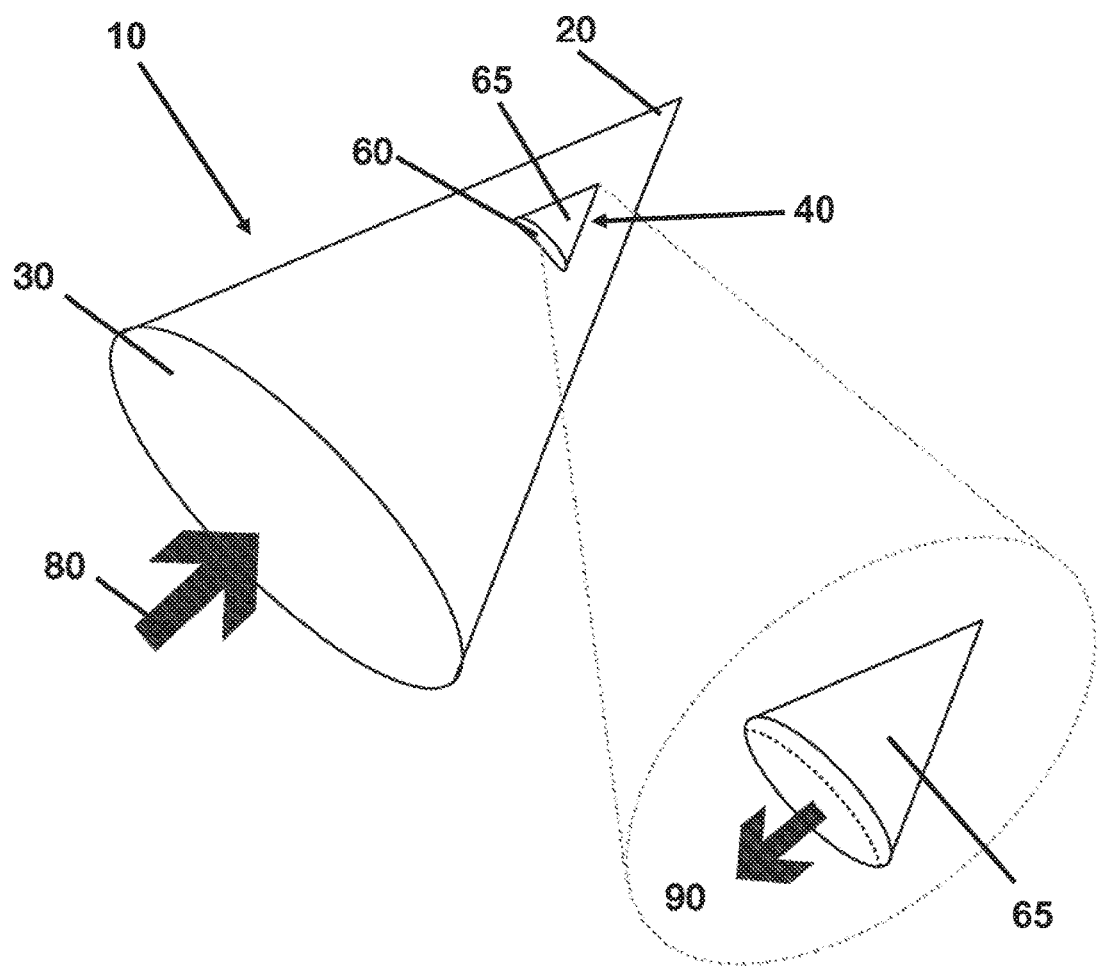
FIG. 2 is a perspective view of a conical embodiment of the invention with an exploded view of the relief outlet.

FIG. 2 is a perspective view of an embodiment of the invention with an exploded view of the relief outlet 40. The embodiment shown in this figure comprises a straight conical shaped capture body 10, but it may be curved around the hub 50. Other shapes that allow entry into, and surround a portion of the moving element can be used; those skilled in the art would recognize that a deltoid, rectangular, square, rounded or ovate shape would also allow for capture of the element. The element flow direction at intake 80 is depicted by the arrow so marked. As flow moves into the increasingly narrow capture body 10 towards the apex 20, it is concentrated, and builds pressure, applying force on the rotor that turns it. The pressurized element is then released through the relief aperture 60 of the relief outlet 40 within the relief body 65. The exploded view depicted within the circle shown in FIG. 2 shows the relief outlet 40 of this conical embodiment. The relief outlet 40 and body 65 follow the contours of the capture body 10 itself, and the relief body 65 is cut out from or mounted onto the capture body 10, and opens to the capture body 10. The element moves from inside the capture body 10 to outside it through the relief aperture 60 with element flow direction at relief outlet 40 as shown by the arrow at reference number 90.

Figure 3:
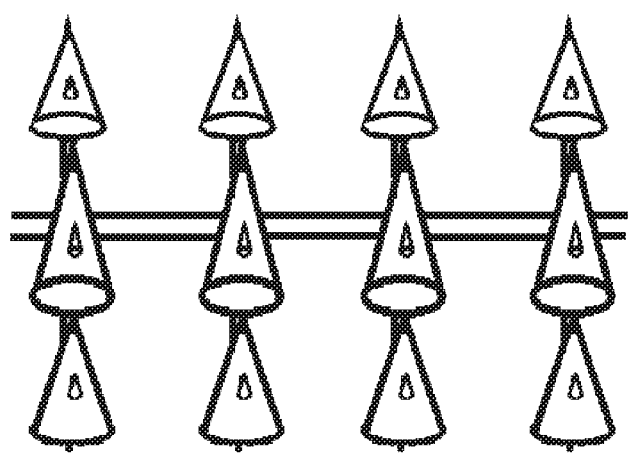
FIG. 3 depicts a plurality of the capture devices mounted on hubs and positioned on the rotor of a wind or water power generation system.

A method of use for the invention comprises mounting the capture device on a traditional and commercially available hub 50 or other structure capable of interface with the rotor of a wind or water power generation system. A plurality of capture devices may be so mounted. This embodiment of the invention is shown in FIG. 3. Multiple mounted capture devices are disposed at a distance from each other calculated to optimize fluid element capture based on the conditions at the site used, including typical wind or water speed. The mounted capture device, hub 50, and related power generation equipment is placed in the path of the moving fluid element, where it flows into the capture body 10 through the intake aperture 30, down though the body and exits the relief outlet 40 through the relief aperture 60. Multiple mounted capture devices around a circular huh 50 allow for capture of the fluid element from every possible direction, and may be stacked upon the rotor shaft to increase power generation potential.

While the description above discloses preferred embodiments of the present invention, it is contemplated that numerous variations and modifications of the invention are possible and are considered to be within the scope of the claims that follow.

I claim:

1. A device for energy generation comprising one or more capture body or bodies, aerodynamically configured and capable of capturing and harnessing wind and water, wherein said capture body or bodies further comprise:
   a. a first end that includes an intake aperture to receive air or water flow;
   b. a midpoint between said first end and a second end; and
   c. the second end further comprises an apex and a relief outlet, wherein said relief outlet is located between said second end and said midpoint, and wherein said relief outlet further comprises an external relief body extending outward from the capture body, wherein said external relief body is shaped to follow the contours of said capture body, and wherein said external relief body directs the flow of air or water in a direction opposite the flow at the intake aperture.

2. The device of claim 1 wherein one or more of the capture bodies are curved around and attached to the outside edge of a rotatable hub connected to a central shaft; said central shaft is turned by the force generated when air or water is captured within the device and pushed into the narrowing capture body by the rotational movement of the hub through the air or water, which creates and amplifies air or water pressure resulting in force that pushes the hub about its axis upon said central shaft connected to a rotor, which drives a turbine capable of generating mechanical or electrical energy.

3. The device of claim 2 wherein a plurality of the devices mounted upon one or more rotating hubs are stacked upon a central shaft.

4. The device of claim 1 wherein one or more of the capture bodies are conically disposed so that captured air or water accumulates and pressure increases as the captured air or water passes through the intake aperture and flows towards the apex.

5. The device of claim 1 wherein said capture body is variably sized depending upon site-specific conditions, including but not limited to the geographic, geologic and hydrologic circumstances.

6. The device of claim 1 wherein said intake aperture and said relief aperture can be adjustably opened or closed to restrict or increase air flow, thereby increasing or decreasing force generated by air, allowing for optimization of energy production under a variety of environmental conditions.

7. The device of claim 1 wherein one or more of said capture bodies is horizontally mounted upon a vertical or transverse axis wind or water turbine.

8. The device of claim 1 wherein a plurality of the the capture bodies are evenly spaced around a circular hub so that wind or water coming from any direction can be captured by said plurality of capture bodies and harnessed for wind or water power generation.

9. A method of generating energy from wind or water comprising the steps of:
   a. Providing a device capable of capturing and harnessing wind or water power, comprising one or more capture body or bodies, aerodynamically configured and capable of capturing and harnessing wind and water, wherein said capture body or bodies further comprise:
      i. a first end that includes an intake aperture to receive air or water flow;
      ii. a midpoint between said first end and a second end; and
      iii. the second end further comprises an apex and a relief outlet, wherein said relief outlet is located between said second end and said midpoint; and wherein said relief outlet further comprises an external relief body extending outward from the capture body, wherein said external relief body is shaped to follow the contours of said capture body, and wherein said external relief body directs the flow of air or water in a direction opposite the flow at the intake aperture;
   b. Mounting said device to a rotatable hub connected to a central shaft that is turned by the force generated when air or water is captured within the device and forced into the narrowing capture body by the rotational movement of said hub through the air or water, which creates and amplifies pressure resulting in said force being directed to said central shaft and ultimately to a power generator;
   c. Stacking multiple hubs with mounted capture bodies upon the central shaft to increase pressure and consequent force upon said central shaft, ultimately providing improved power generation potential;
   d. Attaching said central shaft with said stacked hubs with capture bodies attached, to the generator;
   e. Placing the central shaft with the hubs with capture bodies attached, connected to the generator, into wind or water flow;
   f. Harvesting and storing energy from the generator for future utilization.

* * * * *